United States Patent
Ito et al.

(10) Patent No.: US 11,541,900 B2
(45) Date of Patent: Jan. 3, 2023

(54) SURROUNDING VEHICLE DISPLAY SYSTEM

(71) Applicant: TOYOTA JIDOSHA KABUSHIKI KAISHA, Toyota (JP)

(72) Inventors: Hironori Ito, Tokyo-to (JP); Ko Igarashi, Tokyo-to (JP); Hiroki Iida, Ichikawa (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 4 days.

(21) Appl. No.: 17/320,822

(22) Filed: May 14, 2021

(65) Prior Publication Data
US 2021/0354714 A1 Nov. 18, 2021

(30) Foreign Application Priority Data

May 15, 2020 (JP) .............................. JP2020-086160

(51) Int. Cl.
*B60W 50/14* (2020.01)
*B60R 11/02* (2006.01)
*B60W 30/095* (2012.01)

(52) U.S. Cl.
CPC ......... *B60W 50/14* (2013.01); *B60R 11/0235* (2013.01); *B60W 30/0956* (2013.01);
(Continued)

(58) Field of Classification Search
CPC ........... B60R 11/0235; B60R 2300/607; B60R 2300/8093; B60R 1/27; B60R 1/23; B60R 1/24; B60R 1/26; B60R 1/25; B60R 2300/8026; B60R 2300/8086; B60R 2300/804; B60W 2554/4045; B60W 2554/4041; B60W 50/14; B60W 2050/146; B60W 30/0956; B60W 2554/4044;
(Continued)

(56) References Cited

U.S. PATENT DOCUMENTS

| 8,504,233 B1 | 8/2013 | Ferguson et al. |
| 2012/0123613 A1* | 5/2012 | Waki ..................... G08G 1/166 701/1 |

(Continued)

FOREIGN PATENT DOCUMENTS

| JP | 2004-21496 A | 1/2004 |
| JP | 2009-193135 A | 8/2009 |

(Continued)

*Primary Examiner* — Nathnael Aynalem
(74) *Attorney, Agent, or Firm* — Sughrue Mion, PLLC

(57) ABSTRACT

The surrounding vehicle display system comprises an object detection device detecting an object in surroundings of a vehicle, an electronic control unit, and a display device. The electronic control unit is configured to generate an object mark based on an output of the object detection device and identify the object mark. The display device displays the surrounding vehicle as a vehicle icon when the object mark is identified as a surrounding vehicle by the electronic control unit. The electronic control unit is configured to determine a position of the vehicle icon with respect to the vehicle on the display device and offset a center position of the vehicle icon from a center position of the object mark identified as the surrounding vehicle based on a predetermined size of the vehicle icon.

5 Claims, 12 Drawing Sheets

(52) U.S. Cl.
CPC ............... *B60R 2300/8026* (2013.01); *B60R 2300/8093* (2013.01); *B60W 2050/146* (2013.01); *B60W 2554/4041* (2020.02); *B60W 2554/4044* (2020.02)

(58) Field of Classification Search
CPC .. B60W 30/12; B60W 30/0953; B60W 30/10; B62D 15/0265; B62D 15/026; B62D 15/0255; B62D 15/025; B62D 15/028; B62D 15/0285; B62D 15/0275; B60T 8/17557; G06V 20/588; G06V 20/58; G08G 1/167; G08G 1/166
USPC ........................................................ 348/148
See application file for complete search history.

(56) References Cited

U.S. PATENT DOCUMENTS

| | | | |
|---|---|---|---|
| 2012/0154591 A1* | 6/2012 | Baur | G08G 1/09623 348/148 |
| 2013/0002871 A1* | 1/2013 | Natroshvili | G06T 7/80 348/148 |
| 2015/0338516 A1 | 11/2015 | Kijima et al. | |
| 2016/0272199 A1* | 9/2016 | Kawahara | G08G 1/04 |
| 2018/0157038 A1 | 6/2018 | Kabe | |
| 2018/0158339 A1* | 6/2018 | Kabe | G08G 1/167 |

FOREIGN PATENT DOCUMENTS

| | | |
|---|---|---|
| JP | 2014-106897 A | 6/2014 |
| JP | 2015-523256 A | 8/2015 |
| JP | 2015-219858 A | 12/2015 |
| JP | 2016-119559 A | 6/2016 |
| JP | 2018-092291 A | 6/2018 |

* cited by examiner

SURROUNDING VEHICLE DISPLAY SYSTEM

FIELD

The present invention relates to a surrounding vehicle display system.

BACKGROUND

In the past, in order to impart information on the surroundings to a driver of a vehicle, it has been known to display the surrounding vehicles etc., detected by an object detection device mounted in the vehicle on a display device inside the vehicle. Regarding this, in PTL 1, it is described to display the surrounding vehicles as vehicle icons when recognizing the surrounding vehicles as obstacles in adjoining lanes.

CITATIONS LIST

Patent Literature

[PTL 1] Japanese Unexamined Patent Publication No. 2018-092291

SUMMARY

Technical Problem

In order to display a surrounding vehicle as a vehicle icon on a display device in this way, it is necessary to determine a relative positional relationship between a host vehicle and the vehicle icon based on results of detection of the surrounding vehicle. For example, it may be considered to arrange the vehicle icon so that a center position of the vehicle icon matches a center position of the object mark identified as the surrounding vehicle.

However, when the surrounding vehicle is running alongside the host vehicle, the object detection device can only detect a side surface of the surrounding vehicle. In this case, the center position of the object mark corresponding to the side surface of the surrounding vehicle will deviate to the host vehicle side from the actual center position of the surrounding vehicle, and the position of the vehicle icon which is displayed centered on the center position of the object mark will also deviate to the host vehicle side. As a result, the perceived distance between the host vehicle and the surrounding vehicle on the display device will differ from the actual distance. This is liable to give a strange feeling to the driver.

Further, if the surrounding vehicle is running on the same lane at the front of the host vehicle, the object detection device can only detect a back surface of the surrounding vehicle, while if the surrounding vehicle is running on the same lane at the rear of the host vehicle, the object detection device can only detect a front surface of the surrounding vehicle. For this reason, in these cases as well, the position of the vehicle icon which is displayed centered on the center position of the object mark will deviate to the host vehicle side and a similar problem will arise.

Further, if the size of the vehicle icon differs from the actual size of the surrounding vehicle, even if making the center position of the vehicle icon match with the actual center position of the surrounding vehicle, the positions of the end faces of the vehicle icon will deviate from the actual positions of the end faces of the surrounding vehicle. As a result, the perceived distance between the host vehicle and the surrounding vehicle on the display device will differ from the actual distance. This is liable to give a strange feeling to the driver.

In consideration of the above technical problem, an object of the present invention is to keep a perceived distance between a host vehicle and a surrounding vehicle on a display device in a vehicle from differing from an actual distance.

Solution to Problem

The summary of the present disclosure is as follows.

(1) A surrounding vehicle display system comprising: an object detection device detecting an object in surroundings of a vehicle; an electronic control unit; and a display device, wherein the electronic control unit is configured to generate an object mark based on an output of the object detection device and identify the object mark, the display device displays the surrounding vehicle as a vehicle icon when the object mark is identified as a surrounding vehicle by the electronic control unit, and the electronic control unit is configured to determine a position of the vehicle icon with respect to the vehicle on the display device and offset a center position of the vehicle icon from a center position of the object mark identified as the surrounding vehicle based on a predetermined size of the vehicle icon.

(2) The surrounding vehicle display system described in above (1), wherein the electronic control unit is configured to offset the center position of the vehicle icon so that a nearby surface of the vehicle icon matches a nearby surface of the object mark identified as the surrounding vehicle.

(3) The surrounding vehicle display system described in above (1) or (2), wherein the electronic control unit is configured to offset the center position of the vehicle icon so that a corner of the vehicle icon matches a corner of the surrounding vehicle if identifying the corner of the surrounding vehicle.

(4) The surrounding vehicle display system described in above (1), wherein the electronic control unit is configured to offset the center position of the vehicle icon so that a nearby surface of the vehicle icon matches a nearby surface of the object mark identified as the surrounding vehicle if the surrounding vehicle is running at a front, rear, or side of the vehicle, and calculate by a weighted average an amount of offset in a vehicle width direction and an amount of offset in a longitudinal direction when offsetting the center position of the vehicle icon if the surrounding vehicle is running diagonally forward or diagonally backward with respect to the vehicle.

(5) The surrounding vehicle display system described in any one of above (1) to (4), wherein if the surrounding vehicle is running along a curve, the electronic control unit is configured to offset the center position of the vehicle icon along a bearing of the curve.

Advantageous Effects of Invention

According to the present invention, it is possible to keep a perceived distance between a host vehicle and a surrounding vehicle on a display device in a vehicle from differing from an actual distance.

DESCRIPTION OF EMBODIMENTS

Figure 1:
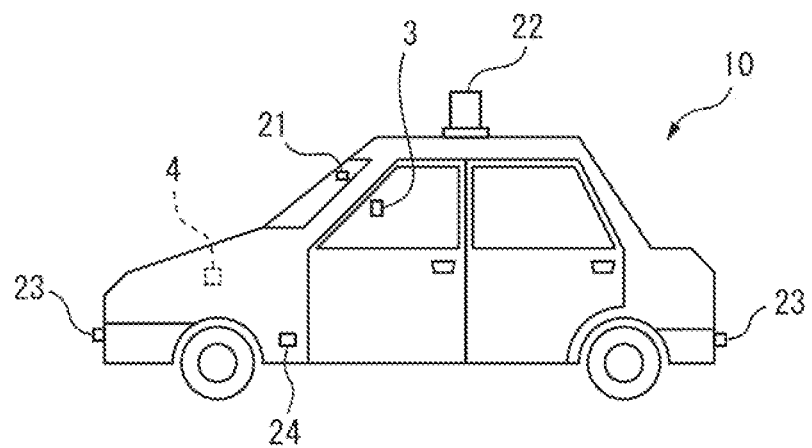
FIG. 1 is a view showing one example of a vehicle in which a surrounding vehicle display system according to a first embodiment of the present invention is mounted.

Below, referring to the drawings, embodiments of the present invention will be explained in detail. Note that, in the following explanation, similar component elements will be assigned the same reference notations.

First Embodiment

First, referring to FIG. 1 to FIG. 9, a first embodiment of the present invention will be explained.

<Explanation of Vehicle Overall>

FIG. 1 is a view showing one example of a vehicle in which the surrounding vehicle display system according to the first embodiment of the present invention is mounted. The vehicle 10 shown in FIG. 1 can perform an autonomous driving in which a part or all of its acceleration, steering, and braking are automatically performed. That is, the vehicle 10 is a so-called "self-driving vehicle".

As shown in FIG. 1, the vehicle 10 is provided with a camera 21, LIDAR (laser imaging detection and ranging device) 22, milliwave radar 23, ultrasonic wave sensor (sonar) 24, display device 3, and electronic control unit (ECU) 4. The camera 21, LIDAR 22, milliwave radar 23, ultrasonic wave sensor (sonar) 24, display device 3, and ECU 4 are connected through an internal vehicle network based on the CAN (Controller Area Network) or other standard to be able to communicate with each other.

The camera 21 captures a front area of the vehicle 10 to generate an image of a predetermined range. In the present embodiment, the camera 21 is provided inside of the vehicle 10, specifically at a back surface of a room mirror in the vehicle.

The LIDAR 22 emits laser light to the surroundings of the vehicle 10 and receives reflected light of the laser light. By doing this, the LIDAR 22 can detect the presence of objects in the surroundings of the vehicle 10 and the distances from the vehicle 10 to the objects. In the present embodiment, the LIDAR 22 is provided on a top part of the vehicle 10, specifically on a roof of the vehicle 10.

The milliwave radar 23 emits a milliwave to the surroundings of the vehicle 10 and receives reflected waves of the milliwave. By doing this, the milliwave radar 23 can detect the presence of objects in the surroundings of the vehicle 10 and the distances from the vehicle 10 to the objects. In the present embodiment, the milliwave radar 23 is provided at a front part and a rear part of the vehicle, specifically a front bumper and a rear bumper of the vehicle 10.

The ultrasonic wave sensor 24 emits an ultrasonic wave to the surroundings of the vehicle 10 and receives reflected waves of the ultrasonic wave. By doing this, the ultrasonic wave sensor 24 can detect the presence of objects in the surroundings of the vehicle 10 and the distances from the vehicle 10 to the objects. In the present embodiment, the ultrasonic wave sensor 24 is provided at a side part of the vehicle.

The display device 3 displays various information to the driver of the vehicle 10. The display device 3 is provided inside of the vehicle so that it can be viewed by the driver of the vehicle 10. The display device 3, for example, is a human-machine interface (HMI) comprised of at least one of a touch screen, heads-up display, digital instrument panel, etc. The display device 3, for example, is provided with a display displaying image information etc., a speaker generating sound, operating buttons for the driver to operate to input instructions, a microphone receiving voice information from the driver, etc.

The ECU 4 is provided at the vehicle 10 and performs various types of control on the vehicle 10. Details of the ECU 4 will be explained later.

<Surrounding Vehicle Display System>

Figure 2:
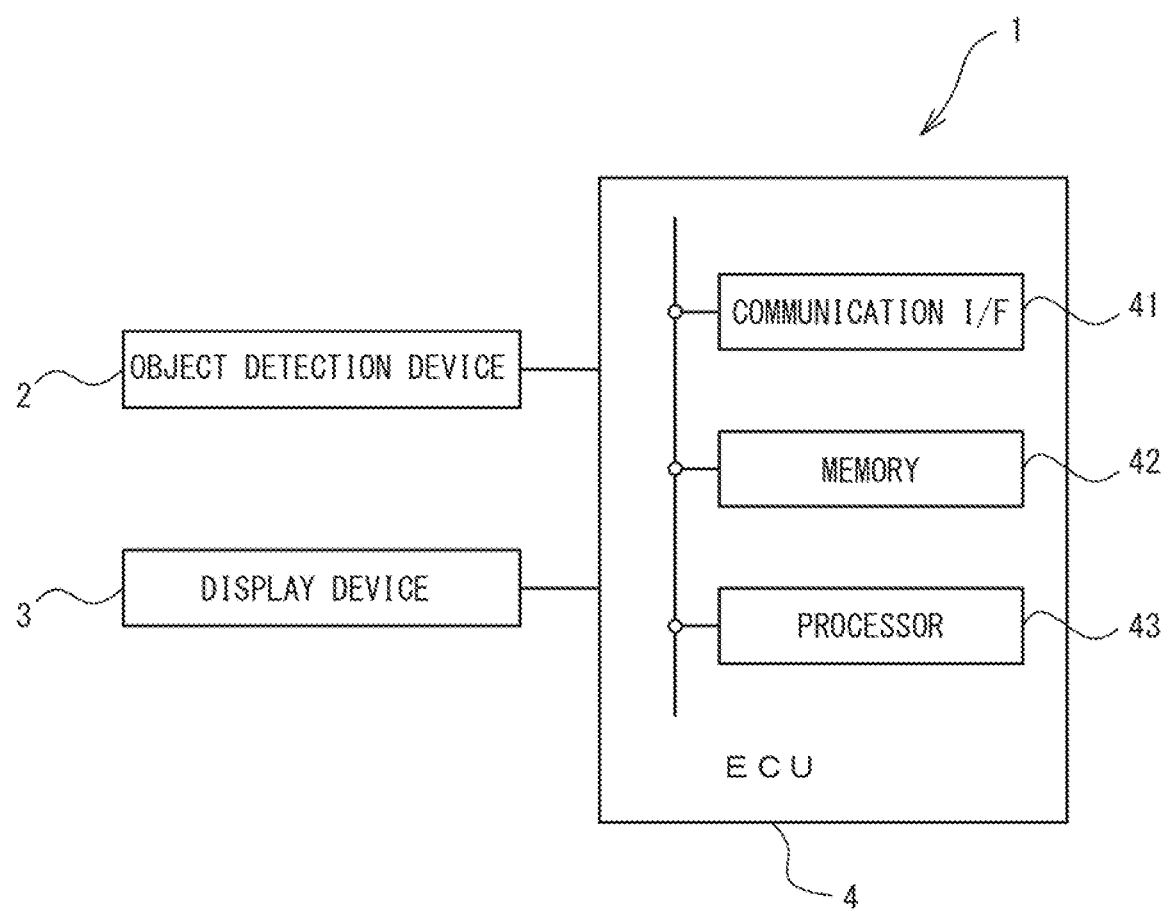
FIG. 2 is a view schematically showing the configuration of the surrounding vehicle display system.

FIG. 2 is a view schematically showing the configuration of the surrounding vehicle display system 1. The surrounding vehicle display system 1 is mounted in the vehicle 10.

When the vehicle 10 is autonomously running, it is desirable that the driver can recognize that the information used for control of the vehicle 10 is correct. For this reason, the surrounding vehicle display system 1 displays to the driver the surrounding vehicles (other vehicles) in the surroundings of the vehicle 10 as grasped by the vehicle 10. By doing this, the driver can confirm that the information grasped by the vehicle 10 and the actual information are not different. As shown in FIG. 2, the surrounding vehicle display system 1 is provided with an object detection device 2, a display device 3, and an ECU 4.

The object detection device 2 detects objects in the surroundings of the vehicle 10 (host vehicle). In the present embodiment, the LIDAR 22 functions as the object detection device 2. Note that, instead of the LIDAR 22, the milliwave radar 23 or the ultrasonic wave sensor 24 may also function as the object detection device 2. Further, if the camera 21 is a stereo camera able to measure distance, the camera 21 may function as the object detection device 2 instead of the LIDAR 22. Furthermore, any combination of the camera 21, the LIDAR 22, the milliwave radar 23, and the ultrasonic wave sensor 24 can function as the object detection device 2. That is, the camera 21, the LIDAR 22, the milliwave radar 23, and the ultrasonic wave sensor 24 are just examples of the object detection device 2.

As shown in FIG. 2, the ECU 4 is provided with a communication interface 41, a memory 42, and a processor 43 and performs various types of control on the vehicle 10. The communication interface 41 and memory 42 are connected through signal lines to the processor 43.

The communication interface 41 has an interface circuit for connecting the ECU 4 to the internal vehicle network. That is, the communication interface 41 is connected through the internal vehicle network to the object detection device 2 and display device 3. The object detection device 2 sends its output through the communication interface 41 to the processor 43. Further, the processor 43 sends instructions relating to display of the surrounding vehicles to the display device 3.

The memory 42, for example, has a volatile semiconductor memory and a nonvolatile semiconductor memory. The memory 42 stores programs, data, etc., used when various types of processing are performed by the processor 43.

The processor 43 has one or more CPUs (central processing units) and their peripheral circuits. Note that, the processor 43 may further have a processing circuit such as a logic processing unit or a numerical processing unit.

Figure 3:
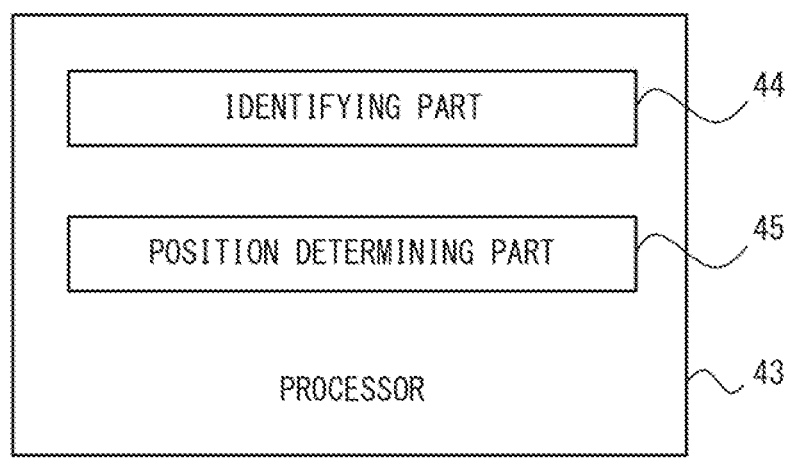
FIG. 3 is a functional block diagram of a processor of an ECU.

FIG. 3 is a functional block diagram of the processor 43 of the ECU 4. In the present embodiment, the processor 43 has an identifying part 44 and a position determining part 45. Specifically, the identifying part 44 and the position determining part 45 are respectively functional modules realized by the processor 43 running programs stored in the memory 42. Note that, the identifying part 44 and the position determining part 45 may respectively be dedicated processing circuits provided at the processor 43.

As explained above, if the LIDAR 22 is used as the object detection device 2, information of the reflected points detected by the laser light (distance, bearing angle, intensity, etc.) is sent to the identifying part 44 as output of the object detection device 2. The identifying part 44 generates object marks based on the output of the object detection device 2 and and identifies those object marks.

Figure 4:
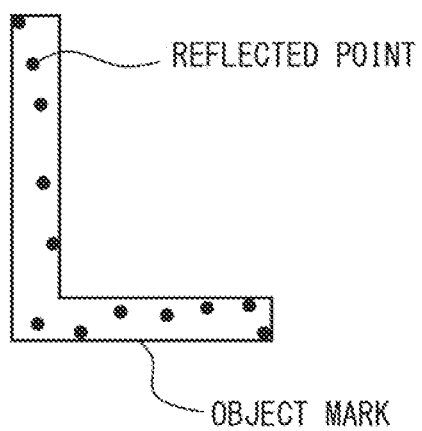
FIG. 4 is a view showing one example of an object mark generated from a group of reflected points.

FIG. 4 is a view showing one example of an object mark generated from a group of reflected points. As shown in FIG. 4, the identifying part 44 groups consecutive reflected points into a group of reflected points and generates an object mark surrounding the group of reflected points. In the example of FIG. 4, an L-shaped object mark is generated.

The identifying part 44 identifies an object mark based on a shape, width, length, bearing, etc., of the object mark. Furthermore, if the object mark is a vehicle (surrounding vehicle), the identifying part 44 identifies the type of the vehicle. In the present embodiment, if the object mark is a vehicle, the vehicle is identified as a passenger car or a truck. That is, in the present embodiment, a surrounding vehicle detected by the object detection device 2 is classified into two types.

When an object mark is identified as a surrounding vehicle by the identifying part 44, the display device 3 displays that surrounding vehicle as a vehicle icon. In the present embodiment, a surrounding vehicle is classified into two types, and therefore two types of vehicle icons are used. That is, if the object mark is a passenger car, a vehicle icon of a passenger car is displayed on the display device 3, while if the object mark is a truck, a vehicle icon of a truck is displayed on the display device 3.

Figure 5:
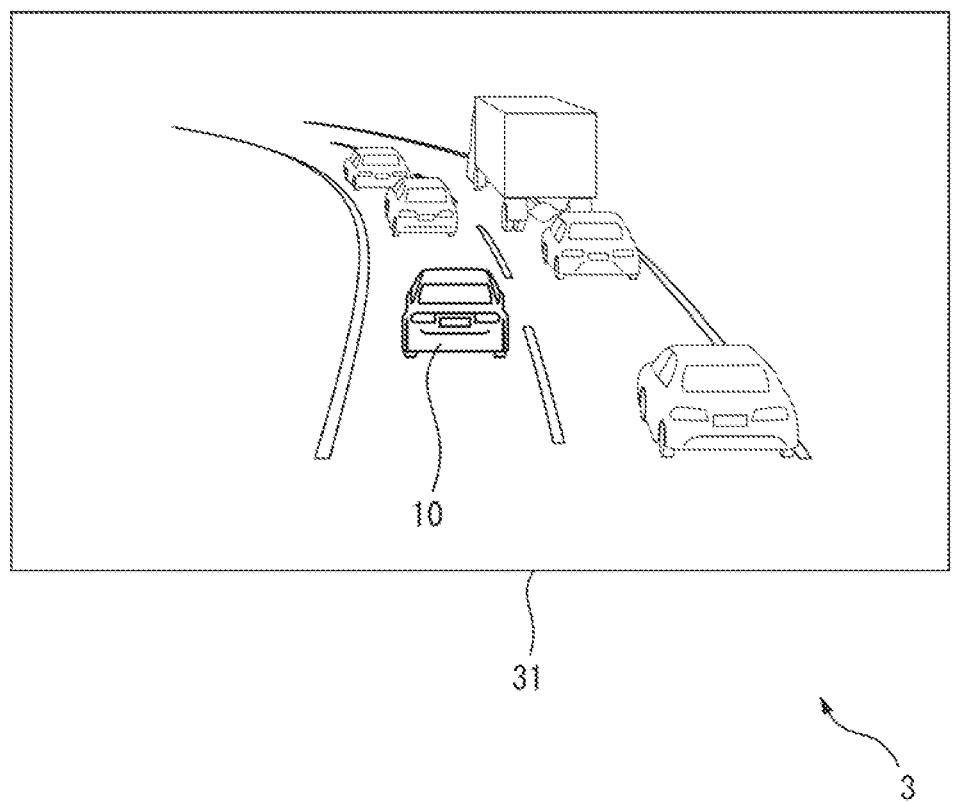
FIG. 5 is a view showing one example of an image displayed on a display of a display device.

FIG. 5 is a view showing one example of an image displayed on a display 31 of the display device 3. As shown in FIG. 5, the display device 3 displays the vehicle 10 and surrounding vehicles in the surroundings of the vehicle 10. In FIG. 5, as the surrounding vehicles, one truck and four passenger cars are displayed. The four passenger cars are shown by the same vehicle icons.

In order to display a surrounding vehicle as a vehicle icon in this way, it is necessary to determine the relative positional relationship of the vehicle 10 and the vehicle icon based on the results of detection of the surrounding vehicle. For this reason, the position determining part 45 determines the position of the vehicle icon with respect to the vehicle 10 on the display device 3.

For example, it may be considered to arrange the vehicle icon so that the center position of the vehicle icon matches a center position of the object mark identified as the surrounding vehicle. However, if only one surface around the four surfaces of the surroundings of the surrounding vehicle (front surface, back surface, right side surface, and left side surface) can be detected, the center position of the object mark identified as the surrounding vehicle and the actual center position of the surrounding vehicle will greatly deviate.

Figure 6:
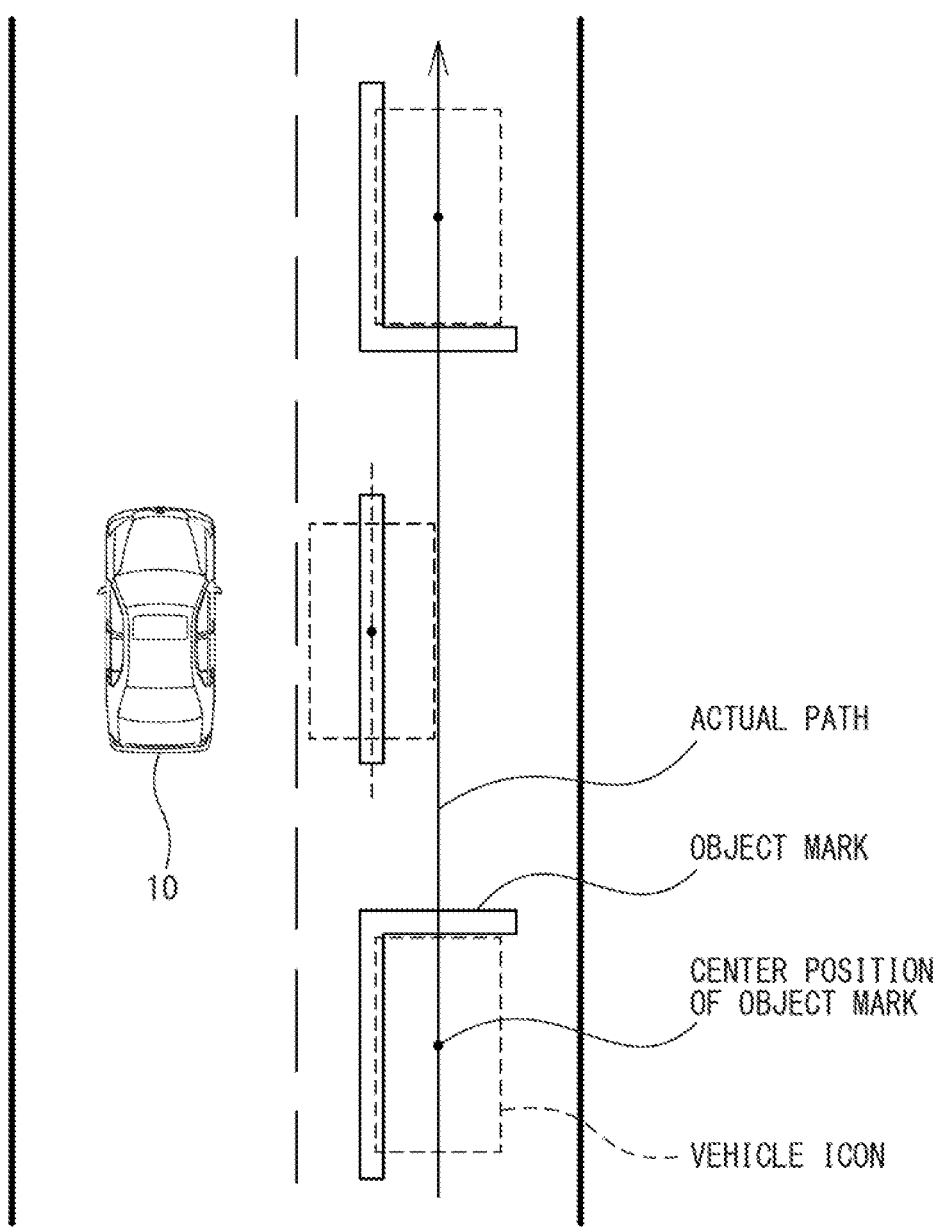
FIG. 6 is a view schematically showing positions of vehicle icons when displayed according to a comparative example.

FIG. 6 is a view schematically showing the positions of vehicle icons when displayed according to a comparative example. Note that, in order to facilitate understanding of the explanation, in FIG. 6, unlike the actual display shown in FIG. 5, an image when viewing the vehicle 10 from above is shown.

In FIG. 6, the vehicle icons displayed at three places when one surrounding vehicle overtakes the vehicle 10 are shown by broken lines. Further, the actual path of the center positions of that surrounding vehicle is shown by the solid line arrow mark. That is, in the example of FIG. 6, when overtaking the vehicle 10, the surrounding vehicle proceeds straight along the center of the lane adjoining the vehicle 10.

When a surrounding vehicle is positioned diagonally backward from the vehicle 10, the front surface and left side surface of the surrounding vehicle can be detected by the object detection device 2, while when a surrounding vehicle is positioned diagonally forward from the vehicle 10, the back surface and left side surface of the surrounding vehicle can be detected by the object detection device 2. For this reason, as shown in FIG. 6, when a surrounding vehicle is positioned diagonally forward or diagonally backward from the vehicle 10, a symmetric L-shaped object mark is generated. In this case, the center position of the object mark shown by the black dot (the center position of the object mark in the vehicle width direction and longitudinal direction) matches the actual center position of the surrounding vehicle. For this reason, if the vehicle icon is displayed so that the center position of the vehicle icon matches the center position of the object mark, the position of the vehicle icon becomes substantially equal to the actual position of the surrounding vehicle.

On the other hand, when a surrounding vehicle is positioned at the right side of the vehicle 10, only the left side surface of the surrounding vehicle can be detected by the object detection device 2 and, as shown in FIG. 6, an I-shaped object mark is generated. In this case, the center position of the object mark shown by the black dot greatly deviates from the actual center position of the surrounding vehicle to the vehicle 10 side in the vehicle width direction. For this reason, if the vehicle icon is displayed so that the center position of the vehicle icon matches the center position of the object mark, the surrounding vehicle displayed as the vehicle icon becomes closer to the vehicle 10 than in actuality. As a result, the perceived distance between the vehicle 10 and the surrounding vehicle on the display device 3 will differ from the actual distance. This is liable to give a strange feeling to the driver.

In particular, when a surrounding vehicle running in an adjoining lane overtakes the vehicle 10, on the display device 3, the surrounding vehicle seems to approach the vehicle 10 in the vehicle width direction. As a result, the driver is liable to feel unease with control of the vehicle 10.

Further, a vehicle icon has a predetermined size corresponding to its type (in the present embodiment, a passenger car or a truck). For this reason, the actual size of a surrounding vehicle may differ from the size of the vehicle icon. For example, in the example of FIG. 6, the lengths of an L-shaped object mark in the vehicle width direction and longitudinal direction are longer than the lengths of the vehicle icon in the vehicle width direction and longitudinal direction. That is, the actual size of the surrounding vehicle is larger than the size of the vehicle icon. For this reason, when a surrounding vehicle is positioned diagonally forward or diagonally backward from the vehicle 10, even if making the center position of the vehicle icon match the actual center position of the surrounding vehicle, the position of an end face of the vehicle icon will deviate from the actual position of the end face of the surrounding vehicle. As a result, the perceived distance between the vehicle 10 and the surrounding vehicle on the display device 3 will differ from the actual distance. This is liable to give a strange feeling to the driver.

Therefore, in the present embodiment, the position determining part 45 offsets the center position of a vehicle icon from the center position of an object mark identified as a surrounding vehicle based on the predetermined size of the vehicle icon. By doing this, the perceived distance between the vehicle 10 and the surrounding vehicle on the display device 3 can be kept from differing from the actual distance.

Specifically, the position determining part 45 offsets the center position of a vehicle icon from the center position of an object mark identified as a surrounding vehicle so that a nearby surface of the vehicle icon matches a nearby surface of the object mark identified as the surrounding vehicle. That is, the position determining part 45 offsets the center position of a vehicle icon from the center position of an object mark identified as a surrounding vehicle so that the distance between the nearby surface of the object mark identified as the surrounding vehicle and the center position of the vehicle icon becomes half of the length of the vehicle icon.

Figure 7:
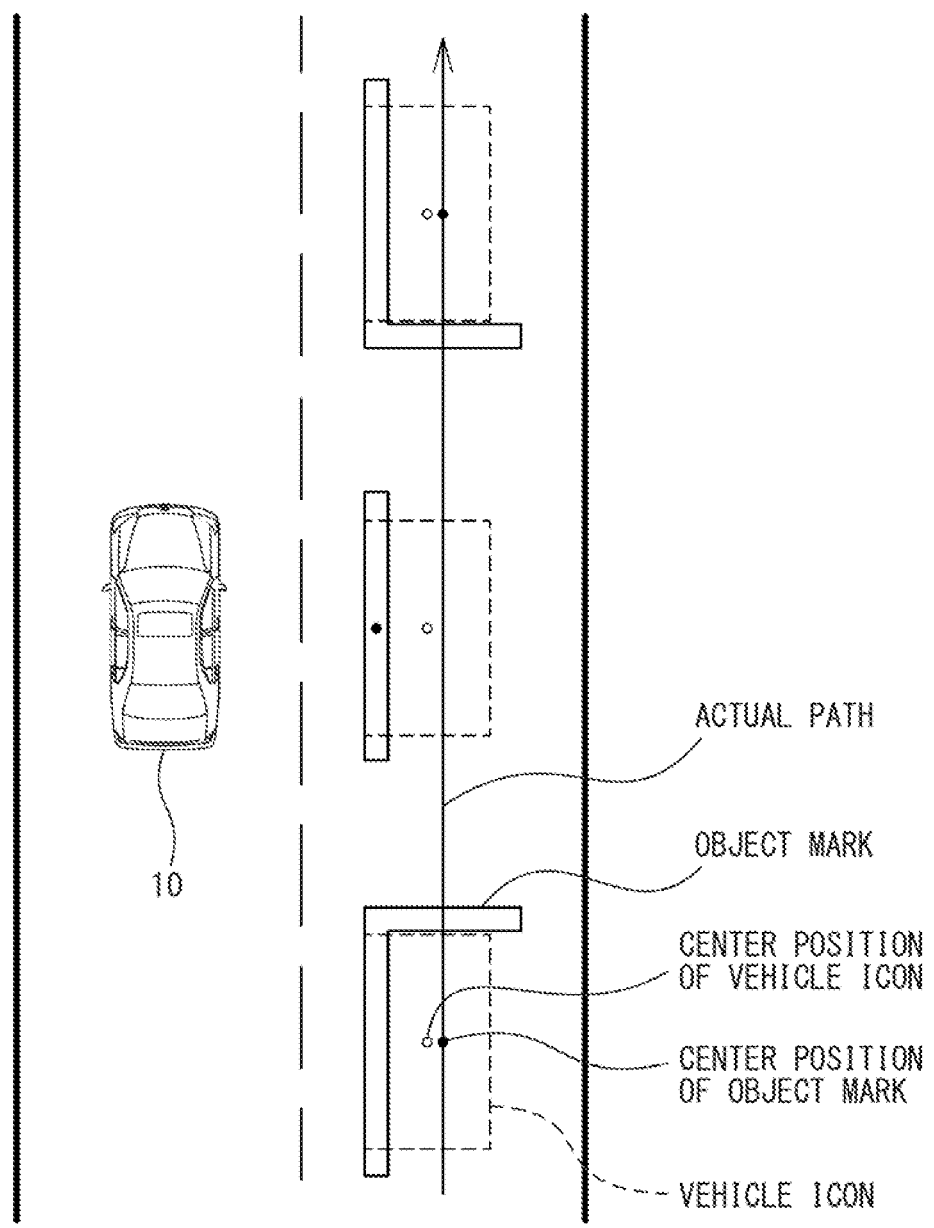
FIG. 7 is a view schematically showing positions of vehicle icons when displayed according to the first embodiment of the present invention.

FIG. 7 is a view schematically showing the positions of vehicle icons displayed in accordance with the first embodiment of the present invention. In FIG. 7, three vehicle icons displayed under the same state as FIG. 6 are shown by broken lines. A "nearby surface" means a surface facing the vehicle 10 side. In the example of FIG. 7, the left side surfaces of the vehicle icons correspond to the nearby surfaces of the vehicle icons. In FIG. 7, the center positions of the vehicle icons when the nearby surfaces of the vehicle icons are made to match the nearby surfaces of the object marks are shown by the white dots.

If the nearby surface of a vehicle icon is a side surface of the vehicle icon (right side surface or left side surface), the center position of the vehicle icon is offset in the vehicle width direction. On the other hand, if the nearby surface of a vehicle icon is a front surface or back surface of the vehicle icon, the center position of the vehicle icon is offset in the longitudinal direction.

Further, when a surrounding vehicle is positioned at a side (right side or left side), front, or rear of the vehicle 10, the center position of the vehicle icon is offset from the center position of an object mark identified as the surrounding vehicle so as to be away from the vehicle 10. On the other hand, when a surrounding vehicle is positioned diagonally forward or diagonally backward from the vehicle 10, the direction of offset of the center position of the vehicle icon depends on the sizes of the vehicle icon and the surrounding vehicle.

Specifically, if a length of a vehicle icon (length in vehicle width direction or length in longitudinal direction) is longer than a length of the surrounding vehicle, the center position of the vehicle icon is offset from the center position of an object mark identified as the surrounding vehicle so as to be away from the vehicle 10. On the other hand, if a length of a vehicle icon is shorter than a length of the surrounding vehicle, the center position of the vehicle icon is offset from the center position of an object mark identified as the surrounding vehicle so as to approach the vehicle 10. In the example of FIG. 7, a length of a vehicle icon in the vehicle width direction is shorter than a length of the surrounding vehicle in the vehicle width direction, and therefore when a surrounding vehicle is positioned diagonally forward or diagonally backward from the vehicle 10, the center position of the vehicle icon is offset so as to approach the vehicle 10.

As shown in FIG. 7, if making the nearby surfaces of the vehicle icons match the nearby surfaces of the object marks, the nearby surfaces of the vehicle icons at the three places are arranged in a single straight line. A driver normally judges the perceived distance between the vehicle 10 and a surrounding vehicle based on the distance to the surface of the surrounding vehicle able to be viewed, that is, the nearby surface of the surrounding vehicle. For this reason, by displaying the vehicle icon as shown in FIG. 7, it is possible to keep the perceived distance between the vehicle 10 and the surrounding vehicle on the display device 3 from differing from the actual distance. Further, when a surrounding vehicle running on the adjacent lane overtakes the vehicle 10, the surrounding vehicle can be kept from approaching the vehicle 10 on the display device 3.

<Vehicle Display Processing>

Figure 8:
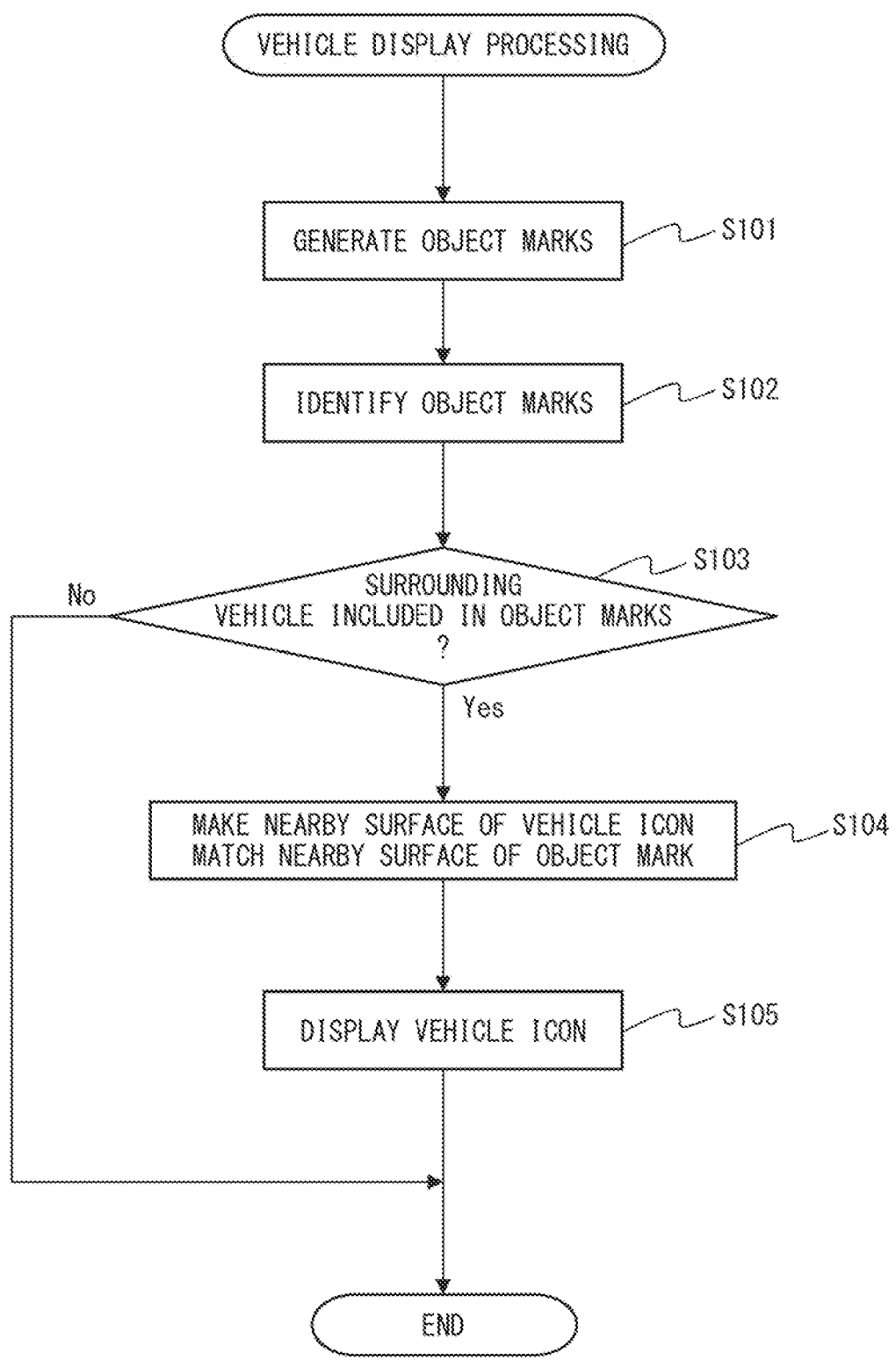
FIG. 8 is a flow chart showing a control routine of vehicle display processing in the first embodiment of the present invention.

Below, referring to the flow chart of FIG. 8, the control for displaying a surrounding vehicle as a vehicle icon on the display device 3 will be explained in detail. FIG. 8 is a flow chart showing a control routine of vehicle display processing in the first embodiment of the present invention. The present control routine is repeatedly performed by the ECU 4 at predetermined performance intervals. The predetermined performance intervals are, for example, the intervals between which the output of the object detection device 2 is sent to the ECU 4.

First, at step S101, the identifying part 44 generates object marks based on the output of the object detection device 2. For example, the identifying part 44 groups consecutive reflected points as a group of reflected points and generates object marks surrounding the groups of reflected points.

Next, at step S102, the identifying part 44 identifies the object marks. For example, the identifying part 44 identifies the object marks based on the shapes, widths, lengths, bearings, etc., of the object marks. Furthermore, if the object marks are vehicles (surrounding vehicles), the identifying part 44 identifies the types of the vehicles.

Next, at step S103, the position determining part 45 judges whether a surrounding vehicle is included in the object marks identified by the identifying part 44. If it is judged that a surrounding vehicle is not included in the object marks, the present control routine ends. On the other hand, if it is judged that a surrounding vehicle is included in the object marks, the present control routine proceeds to step S104.

At step S104, the position determining part 45 makes the nearby surface of the vehicle icon match the nearby surface of the object mark identified as the surrounding vehicle. Specifically, when the surrounding vehicle is positioned at the right side region of the vehicle 10, the position determining part 45 makes the left side surface of the vehicle icon match the nearby surface of the object mark, while when the surrounding vehicle is positioned at the left side region of the vehicle 10, the position determining part 45 makes the right side surface of the vehicle icon match the nearby surface of the object mark. At this time, in order to determine the position of the vehicle icon in the longitudinal direction, the position determining part 45, for example, makes the center position of the vehicle icon in the longitudinal direction match the center position of the object mark in the longitudinal direction. Note that, the position determining part 45 may make the back end of the vehicle icon match the back end of the object mark or make the front end of the vehicle icon match the front end of the object mark.

Further, when the surrounding vehicle is positioned at the front region of the vehicle 10, the position determining part 45 makes the back surface of the vehicle icon match the nearby surface of the object mark, while when the surrounding vehicle is positioned at the rear region of the vehicle 10, it makes the front surface of the vehicle icon match the nearby surface of the object mark. At this time, in order to determine the position of the vehicle icon in the vehicle width direction (left-right direction), the position determining part 45, for example, makes the center position of the vehicle icon in the vehicle width direction match the center position of the object mark in the vehicle width direction. Note that, the position determining part 45 may make the right end of the vehicle icon match the right end of the object mark or make the left end of the vehicle icon match the left end of the object mark.

As explained above, in the present embodiment, the nearly surface of the vehicle icon used for determining the position of the vehicle icon is identified in accordance with the position of the surrounding vehicle (right side region, left side region, front region, or rear region). In this connection, the position determining part 45, for example, identifies the position of the surrounding vehicle based on the bearing angle of the surrounding vehicle when viewed from the vehicle 10. The bearing angle of the surrounding vehicle is, for example, defined as shown in FIG. 9.

Figure 9:
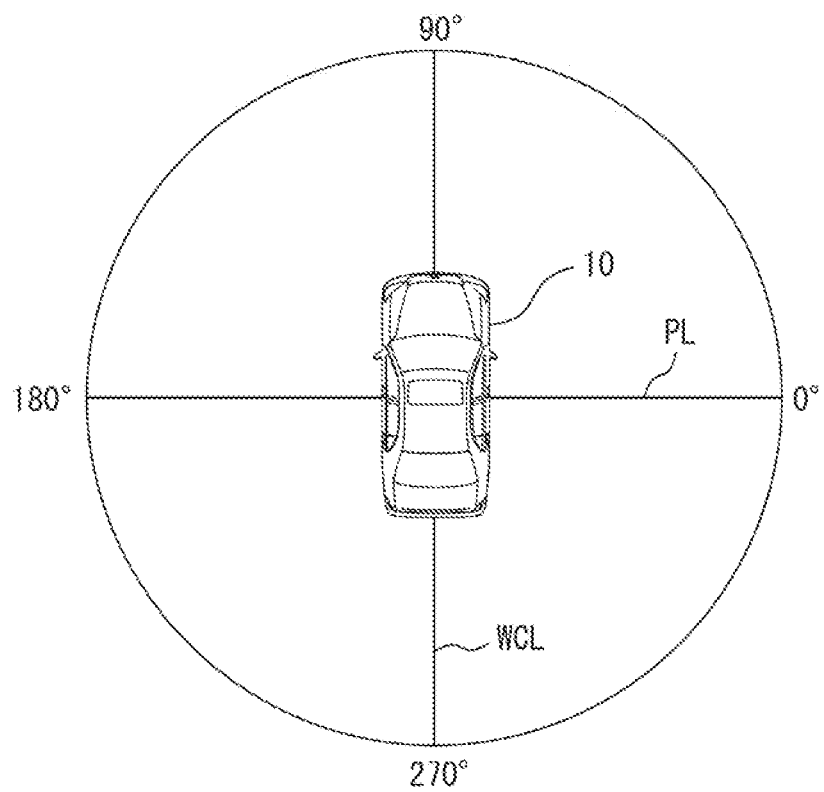
FIG. 9 is a view showing one example of a bearing angle of a surrounding vehicle when viewed from a host vehicle.

In FIG. 9, a vehicle width centerline WCL of the vehicle 10 and a perpendicular line PL perpendicularly intersecting the vehicle width centerline WCL and running through the center of the vehicle 10 are shown. In this example, the bearing angle when the center position of the object mark identified as the surrounding vehicle is positioned on the right side of the vehicle 10 and is positioned on the perpendicular line PL is set to 0°. Further, the bearing angle when the center position of the object mark identified as the surrounding vehicle is positioned at the front side of the vehicle 10 and is positioned on the vehicle width centerline WCL is set to 90°. Further, the bearing angle when the center position of the object mark identified as the surrounding vehicle is positioned on the left side of the vehicle 10 and is positioned on the perpendicular line PL is set to 180°. Further, the bearing angle when the center position of the object mark identified as the surrounding vehicle is positioned at the rear side of the vehicle 10 and is positioned on the vehicle width centerline WCL is set to 270°.

The position determining part 45, for example, judges that the surrounding vehicle is positioned at the right side region of the vehicle when the bearing angle of the surrounding vehicle is 0° to 70° or 290° to 360° and judges that the surrounding vehicle is positioned at the left side region of the vehicle when the bearing angle of the surrounding vehicle is 110° to 250°. Further, the position determining part 45, for example, judges that the surrounding vehicle is positioned at the front region of the vehicle when the bearing angle of the surrounding vehicle is 70° to 110° and judges that the surrounding vehicle is positioned at the rear region of the surrounding vehicle when the bearing angle of the surrounding vehicle is 250° to 290°.

After step S104, at step S105, the position determining part 45 displays the vehicle icon on the display device 3 in accordance with the position of the vehicle icon determined at step S104. After step S105, the present control routine ends.

Second Embodiment

The surrounding vehicle display system according to the second embodiment is basically similar in configuration and control to the surrounding vehicle display system according to the first embodiment except for the points explained below. For this reason, below, the second embodiment of the present invention will be explained centered on the parts different from the first embodiment.

As shown in FIG. 6 and FIG. 7, when the surrounding vehicle is positioned diagonally forward or diagonally backward from the vehicle 10, an L-shaped object mark is generated. That is, in this case, two adjoining surfaces of the surrounding vehicle are detected by the object detection device 2, and the corner of the L shape corresponds to the corner of the surrounding vehicle. Therefore, the identifying part 44 can identify the corner of the surrounding vehicle from the L-shaped object mark.

Therefore, in the second embodiment, when the corner of the surrounding vehicle has been identified by the identifying part 44, the position determining part 45 offsets the center position of the vehicle icon from the center position of the object mark identified as the surrounding vehicle so that the corner of the vehicle icon matches the corner of the surrounding vehicle. On the other hand, when the corner of the surrounding vehicle has not been identified by the identifying part 44, the position determining part 45 offsets the center position of the vehicle icon from the center position of the object mark identified as the surrounding vehicle so that the nearly surface of the vehicle icon matches the nearby surface of the object mark identified as the surrounding vehicle.

Figure 10:
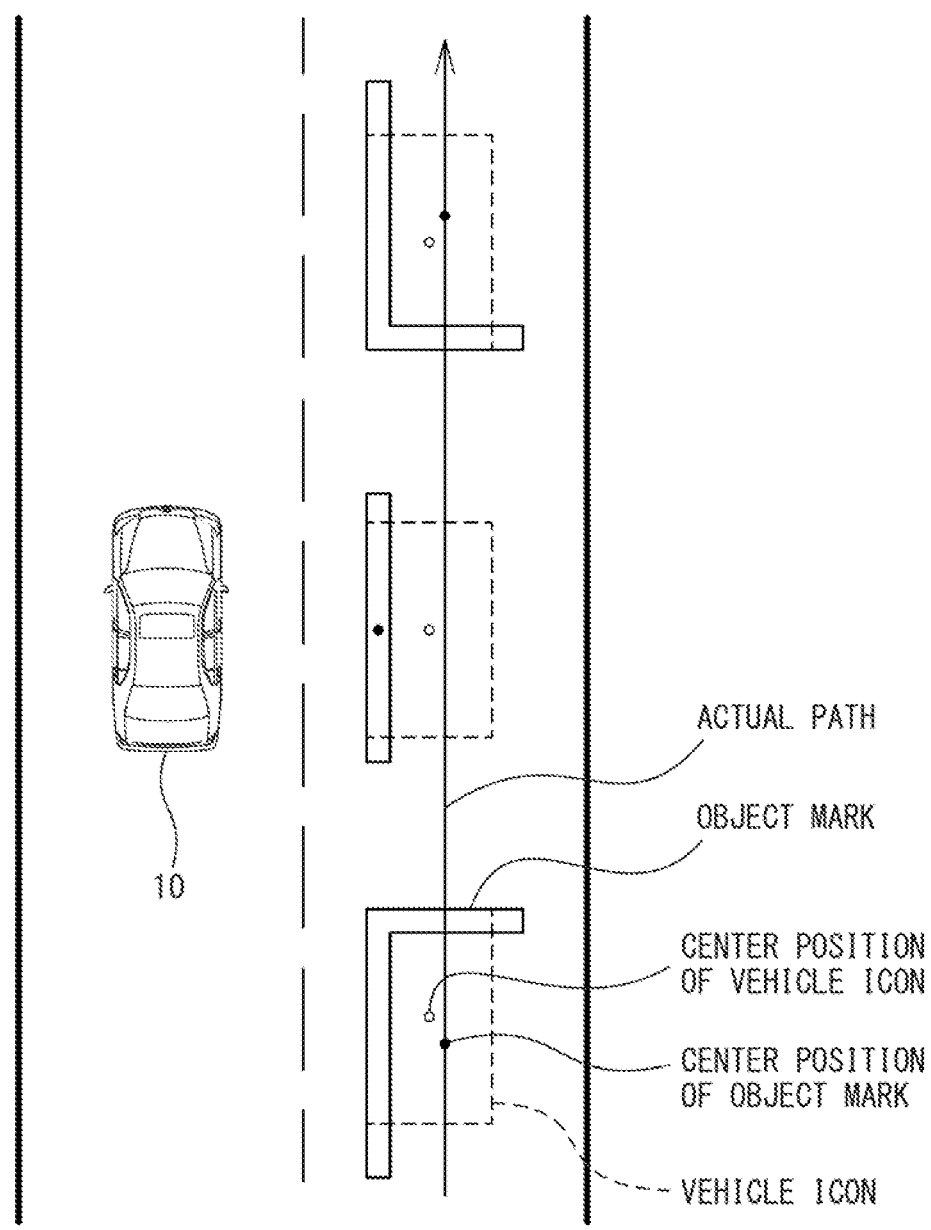
FIG. 10 is a view schematically showing positions of vehicle icons when displayed according to a second embodiment of the present invention.

FIG. 10 is a view schematically showing the positions of vehicle icons when displayed according to the second embodiment of the present invention. In FIG. 10, three vehicle icons displayed under the same states as FIG. 6 and FIG. 7 are shown by broken lines. As shown in FIG. 10, when the corner of a vehicle icon is made to match the corner of the surrounding vehicle, the two surfaces which can be seen from the vehicle 10 can be made to align with the actual surfaces of the surrounding vehicle. Therefore, the perceived distance on the display device 3 between the vehicle 10 and the surrounding vehicle can be kept from differing from the actual distance more.

<Vehicle Display Processing>

Figure 11:
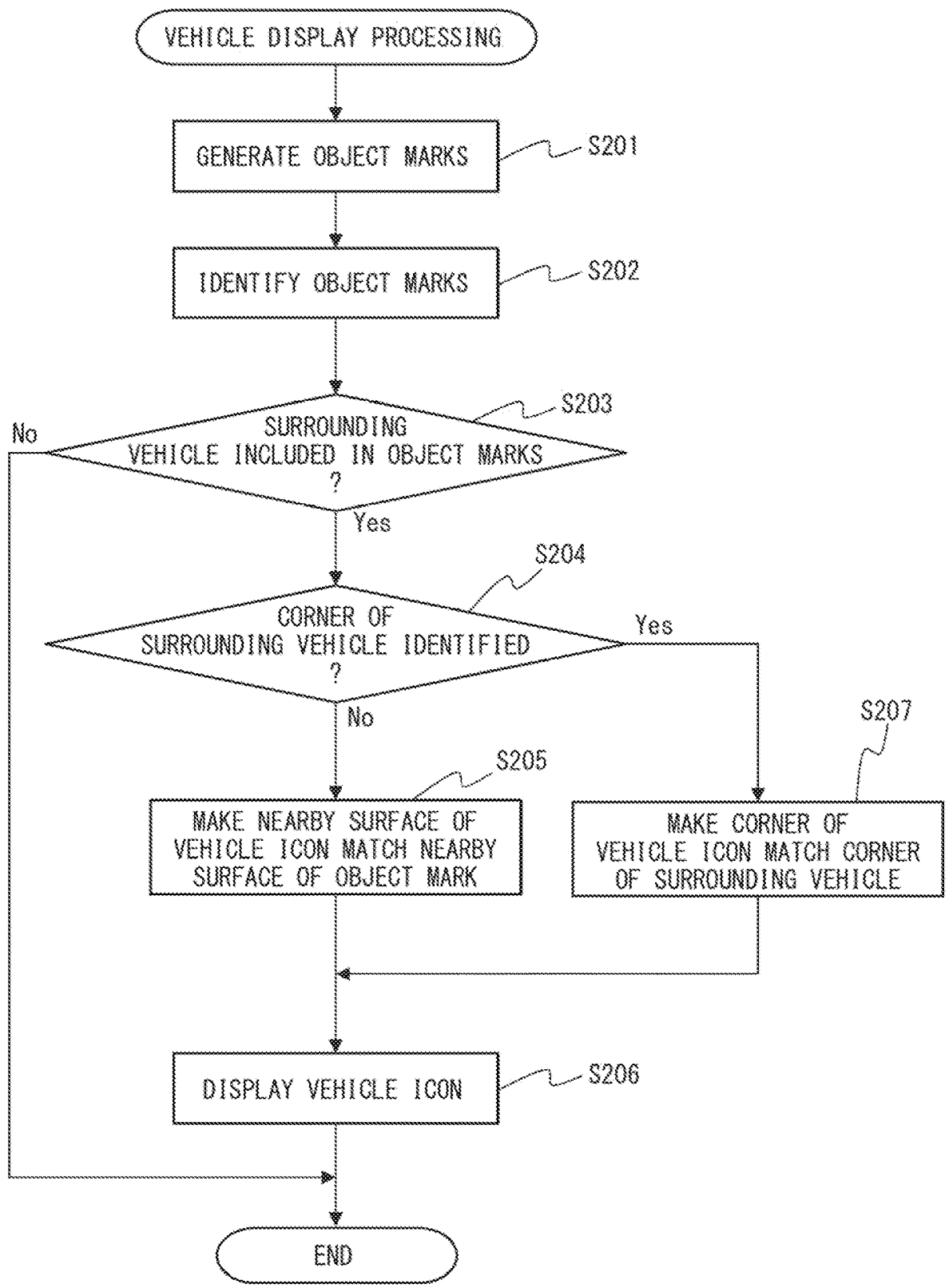
FIG. 11 is a flow chart showing a control routine of vehicle display processing in the second embodiment of the present invention.

FIG. 11 is a flow chart showing a control routine of vehicle display processing in the second embodiment of the present invention. The present control routine is repeatedly performed by the ECU 4 at predetermined performance intervals. The predetermined performance intervals are, for example, the intervals between which the output of the object detection device 2 is sent to the ECU 4.

Step S201 to step S203 are performed in the same way as step S101 to step S103 of FIG. 8. If at step S203 it is judged that no surrounding vehicle is included in the object marks, the present control routine ends. On the other hand, if at step S203 it is judged that a surrounding vehicle is included in the object marks, the present control routine proceeds to step S204.

At step S204, the position determining part 45 judges whether a corner of the surrounding vehicle has been identified by the identifying part 44. For example, if both of the lengths in the vehicle width direction and longitudinal direction of the object mark generated by the identifying part 44 are equal to or greater than predetermined values, the position determining part 45 judges that a corner of the surrounding vehicle has been identified by the identifying part 44, while if at least one of the lengths in the vehicle width direction and longitudinal direction of the object mark is less than the predetermined value, it judges that no corner of the surrounding vehicle has been identified by the identifying part 44.

If at step S204 it is judged that no corner of the surrounding vehicle was identified, the present control routine proceeds to step S205. Step S205 and step S206 are performed in the same way as step S104 and step S105 of FIG. 8.

On the other hand, if at step S204 it is judged that a corner of the surrounding vehicle is identified, the present control routine proceeds to step S207. At step S207, the position determining part 45 makes the corner of the vehicle icon match the corner of the surrounding vehicle. That is, the position determining part 45 makes the two adjoining surfaces of the vehicle icon match the two adjoining surfaces of the object mark identified as the surrounding vehicle.

Next, at step S206, the position determining part 45 displays the vehicle icon on the display device 3 in accordance with the position of the vehicle icon determined at step S207. After step S206, the present control routine ends.

Third Embodiment

The surrounding vehicle display system according to the third embodiment is basically similar in configuration and control to the surrounding vehicle display system according to the first embodiment except for the points explained below. For this reason, below, the third embodiment of the present invention will be explained centered on the parts different from the first embodiment.

For example, a scene may be envisioned in which a surrounding vehicle which had been running alongside the vehicle 10 in the right side lane changes lanes and thereby moves to the front of the vehicle 10. In this case, according to the first embodiment, when the surrounding vehicle is positioned at the right side region of the vehicle 10, the position determining part 45 makes the left side surface of the vehicle icon match the nearby surface of the object mark, while when the surrounding vehicle is positioned at the front region of the vehicle 10, it makes the back surface of the vehicle icon match the nearby surface of the object mark. When the targeted nearby surface is switched in this way, the direction in which the center position of the vehicle icon is offset changes. For this reason, the phenomenon of the vehicle icon moving discontinuously on the display device 3, so-called position jumping, is liable to occur. Further, even if making the corner of the vehicle icon match the corner of the surrounding vehicle like in the second embodiment, if the positional precision the corner of the surrounding vehicle identified by the identifying part 44 falls due to noise etc., a similar phenomenon is liable to arise.

For this reason, in the third embodiment, in a transition region where the targeted nearby surface is switched, the position determining part 45 makes the direction and amount of offsetting the center position of the vehicle icon gradually change. Specifically, if the surrounding vehicle is running diagonally forward or diagonally backward from the vehicle 10, the position determining part 45 calculates by the weighted average the amount of offset in the vehicle width direction and the amount of offset in the longitudinal direction when offsetting the center position of the vehicle icon. On the other hand, if the surrounding vehicle is running at the front, rear, or side of the vehicle 10, the position determining part 45 offsets the center position of the vehicle icon from the center position of the object mark identified as the surrounding vehicle so that the nearby surface of the vehicle icon matches the nearby surface of the object mark identified as the surrounding vehicle. By doing this, when the targeted nearby surface is switched, it is possible to keep the direction in which the center position of the vehicle icon is offset from rapidly changing and in turn possible to keep the vehicle icon from moving discontinuously on the display device 3.

<Vehicle Display Processing>

Figure 12:
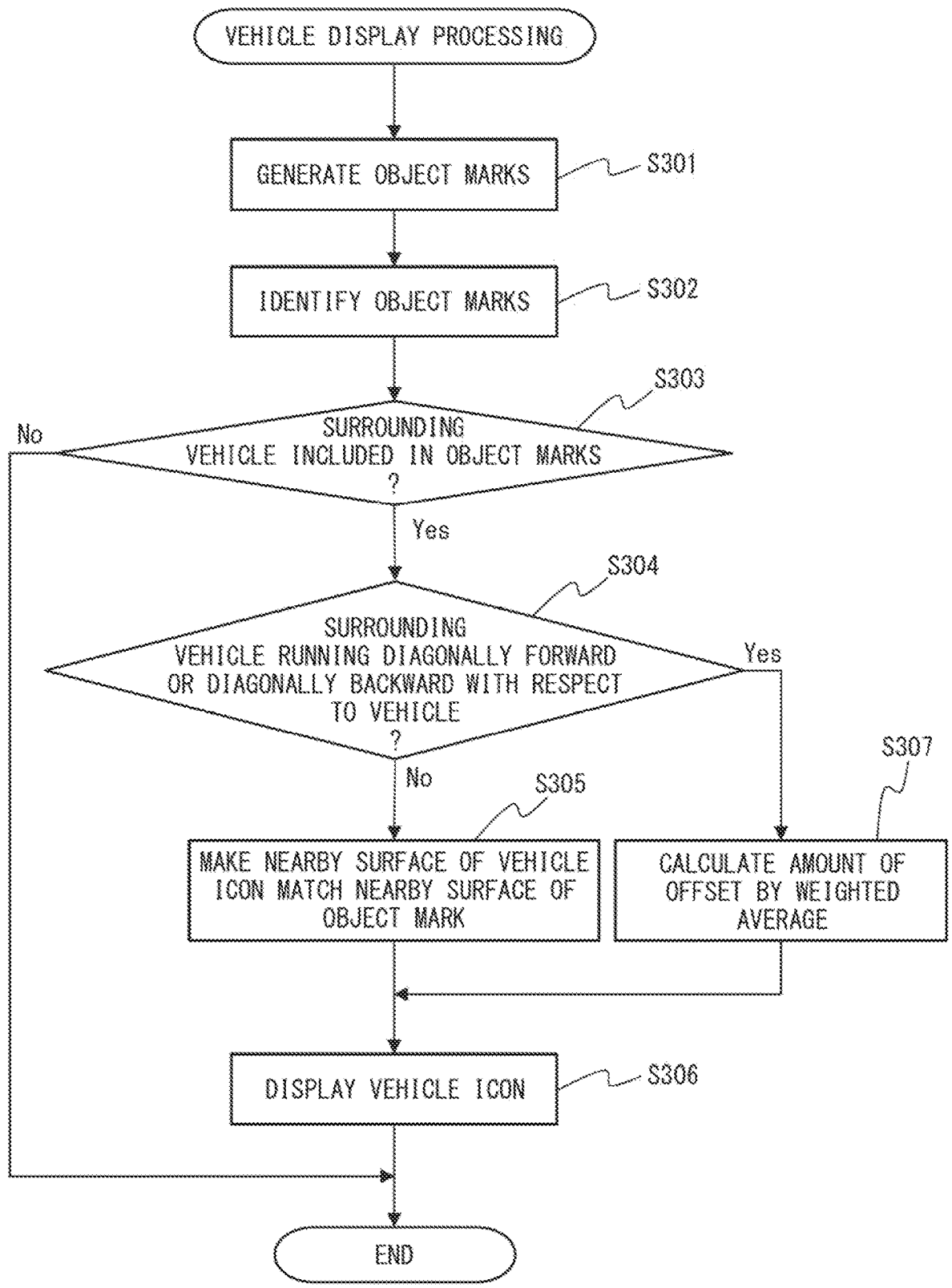
FIG. 12 is a flow chart showing a control routine of vehicle display processing in a third embodiment of the present invention.

FIG. 12 is a flow chart showing a control routine of vehicle display processing in the third embodiment of the present invention. The present control routine is repeatedly performed by the ECU 4 at predetermined performance intervals. The predetermined performance intervals are, for example, the intervals between which the output of the object detection device 2 is sent to the ECU 4.

Step S301 to step S303 are performed in the same way as step S101 to step S103 of FIG. 8. If at step S303 it is judged that no surrounding vehicle is included in the object marks, the present control routine ends. On the other hand, if at step S303 it is judged that a surrounding vehicle is included in the object marks, the present control routine proceeds to step S304.

At step S304, the position determining part 45 judges whether the surrounding vehicle is running diagonally forward or diagonally backward from the vehicle 10. For example, if the bearing angle of the surrounding vehicle is defined as shown in FIG. 9, the position determining part 45 judges that the surrounding vehicle is running diagonally forward from the vehicle 10 when the bearing angle of the surrounding vehicle is 60° to 80° or 100° to 120° and judges that the surrounding vehicle is running diagonally backward from the vehicle 10 when the bearing angle of the surrounding vehicle is 240° to 260' or 280° to 300°.

If at step S304 it is judged that the surrounding vehicle is not running diagonally forward or diagonally backward from the vehicle 10, i.e., if it is judged that the surrounding vehicle is running at the front, back, or side of the vehicle 10, the present control routine proceeds to step S305. Step S305 and step S306 are performed in the same way as step S104 and step S105 of FIG. 8.

On the other hand, if at step S304 it is judged that the surrounding vehicle is running diagonally forward or diagonally backward from the vehicle 10, the present control routine proceeds to step S307. At step S307, the position determining part 45 calculates by the weighted average the amount of offset in the vehicle width direction and the amount of offset in the longitudinal direction when offsetting the center position of the vehicle icon. For example, if the surrounding vehicle is running diagonally forward from the vehicle 10, the position determining part 45 reduces the amount of offset in the vehicle width direction and enlarges the amount of offset in the longitudinal direction as the bearing angle of the surrounding vehicle approaches 90°. Further, if the surrounding vehicle is running diagonally backward from the vehicle 10, the position determining part 45 reduces the amount of offset in the vehicle width direction and enlarges the amount of offset in the longitudinal direction as the bearing angle of the surrounding vehicle approaches 270°.

After step S307, at step S306, the position determining part 45 displays the vehicle icon on the display device 3 in accordance with the position determined at step S307. After step S306, the present control routine ends.

Fourth Embodiment

The surrounding vehicle display system according to the fourth embodiment is basically similar in configuration and control to the surrounding vehicle display system according to the first embodiment except for the points explained below. For this reason, below, the fourth embodiment of the present invention will be explained centered on the parts different from the first embodiment.

As explained above, the center position of the vehicle icon is offset from the center position of the object mark identified as the surrounding vehicle in the vehicle width direction or the longitudinal direction. However, sometimes the identified surrounding vehicle is running along a curve. In this case, if the center position of the vehicle icon is offset in the vehicle width direction or longitudinal direction, the surrounding vehicle is liable to stick out from the lane on the display device 3.

For this reason, in the fourth embodiment, if a surrounding vehicle is running along a curve, the position determining part 45 offsets the center position of the vehicle icon along the bearing of the curve. By doing this, it is possible to keep a strange feeling from arising when displaying a surrounding vehicle running along a curve.

Figure 13:
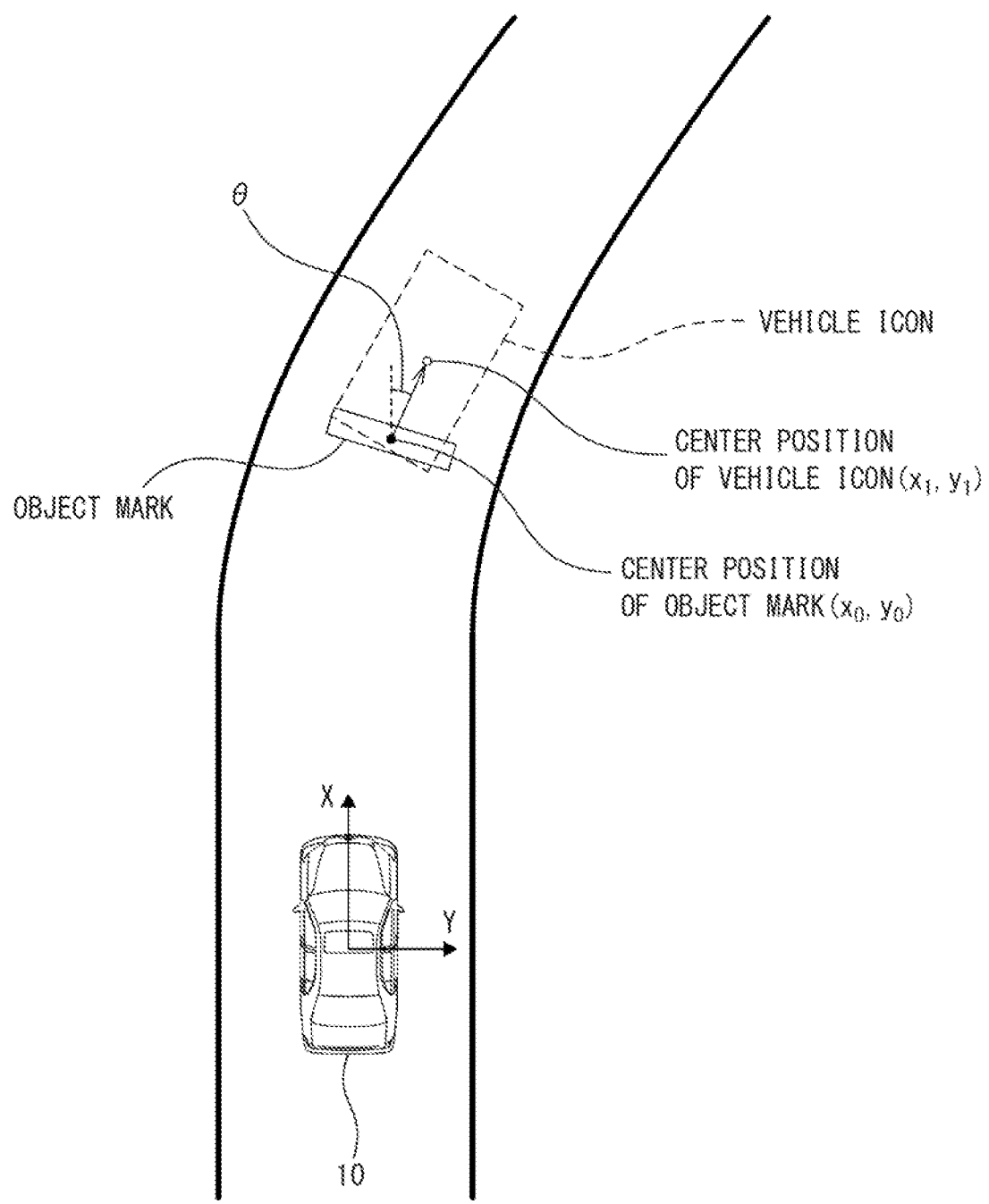
FIG. 13 is a view schematically showing positions of vehicle icons when displayed according to a fourth embodiment of the present invention.

FIG. 13 is a view schematically showing the position of a vehicle icon when displayed according to the fourth embodiment of the present invention. In the example of FIG. 13, the surrounding vehicle is running along a curve at the front region of the vehicle 10. As shown in FIG. 13, the center position of the vehicle icon (white dot) is offset along the bearing of the curve from the center position of the object mark identified as the surrounding vehicle (black dot).

For example, the center position of the vehicle icon is calculated as a point in a reference coordinate system having the current position of the center of the vehicle 10 as its origin. In the reference coordinate system, as shown in FIG. 13, the vehicle width centerline of the vehicle 10 is made the X-axis and the axis which runs through the center of the vehicle 10 and perpendicularly intersects the X-axis is made the Y-axis.

In this case, the position determining part 45 calculates the coordinates of the center position of the vehicle icon ($x_1$, $y_1$) by the following formulas (1) and (2) so that the center position of the vehicle icon is offset along the bearing of the curve:

$$x_1 = x_0 + (Li/2 - Lt/2) \cdot \cos \theta \quad (1)$$

$$y_1 = y_0 \leftrightarrows (Li/2 - Lt/2) \cdot \sin \theta \quad (2)$$

Here, $x_0$ and $y_0$ are respectively the values of the X-coordinate and Y-coordinate of the center position of the object mark, Li is the length of the vehicle icon in the longitudinal direction, and Lt is the length of the object mark identified as the surrounding vehicle in the longitudinal direction. That is, Li/2–Lt/2 corresponds to the amount of offset of the vehicle icon. θ is the angle formed by a tangent of the curve along which the surrounding vehicle is running and the X-axis and corresponds to the bearing of the curve along which the surrounding vehicle is running. The bearing θ of the curve, for example, is calculated based on the bearing of a white line etc., detected by the camera 21. Note that, the bearing θ of the curve may be calculated using vehicle-to-vehicle communication between the vehicle 10 and the surrounding vehicle etc. Further, in the above-mentioned formulas (1) and (2), the length Lt of the object mark in the longitudinal direction may be approximated as zero.

When the surrounding vehicle is positioned at the front region of the vehicle 10 as shown in FIG. 13, the center position of the vehicle icon is offset to the front from the center position of the object mark. On the other hand, when the surrounding vehicle is positioned at the rear region of the vehicle 10, the center position of the vehicle icon is offset to the rear from the center position of the object mark. For this reason, when the surrounding vehicle is running along a curve at the rear region of the vehicle 10, the sign of the second term of the right side of the above-mentioned formula (1) is made negative.

Note that, if the surrounding vehicle is not running along a curve in the front region of the vehicle 10, it is possible to calculate the center position of the vehicle icon by making the θ of the above-mentioned formulas (1) and (2) 0 deg. Similarly, if the surrounding vehicle is not running along a curve at the rear region of the vehicle 10, it is possible to calculate the center position of the vehicle icon by making the sign of the second term at the right side of the above-mentioned formula (1) negative and making the θ of the above-mentioned formulas (1) and (2) 0 deg.

Further, when the surrounding vehicle is positioned at the right side region of the vehicle 10, the center position of the vehicle icon is offset to the right side from the center position of the object mark. In this case, the position determining part 45 calculates the coordinates of the center position of the vehicle icon ($x_1$, $y_1$) by the following formulas (3) and (4) so that the center position of the vehicle icon is offset along the bearing of the curve:

$$x_1 = x_0 + (Wi/2 - Wt/2) \cdot \sin \theta \quad (3)$$

$$y_1 = y_0 + (Wi/2 - Wt/2) \cdot \cos \theta \quad (4)$$

Here, Wi is the length of the vehicle icon in the vehicle width direction (width of vehicle icon), while Wt is the length of the object mark identified as the surrounding vehicle in the vehicle width direction (width of object mark). That is, Wi/2–Wt/2 corresponds to the amount of offset of the vehicle icon. Note that, in the above-mentioned formulas (3) and (4), the length Wt of the object mark in the vehicle width direction may be approximated as zero.

On the other hand, when the surrounding vehicle is positioned at the left side region of the vehicle 10, the center position of the vehicle icon is offset to the left side from the center position of the object mark. For this reason, if the surrounding vehicle is running along a curve at the left side region of the vehicle 10, the sign of the second term on the right side of the above-mentioned formula (4) is made negative.

Note that, if the surrounding vehicle is not running along a curve at the right side region of the vehicle 10, it is possible to calculate the center position of the vehicle icon by making the θ of the above-mentioned formulas (3) and (4) 0 deg.

Similarly, if the surrounding vehicle is not running along a curve at the left side region of the vehicle 10, it is possible to calculate the center position of the vehicle icon by making the sign of the second term at the right side of the above-mentioned formula (4) negative and making the θ of the above-mentioned formulas (3) and (4) 0 deg.

<Vehicle Display Processing>

Figure 14:
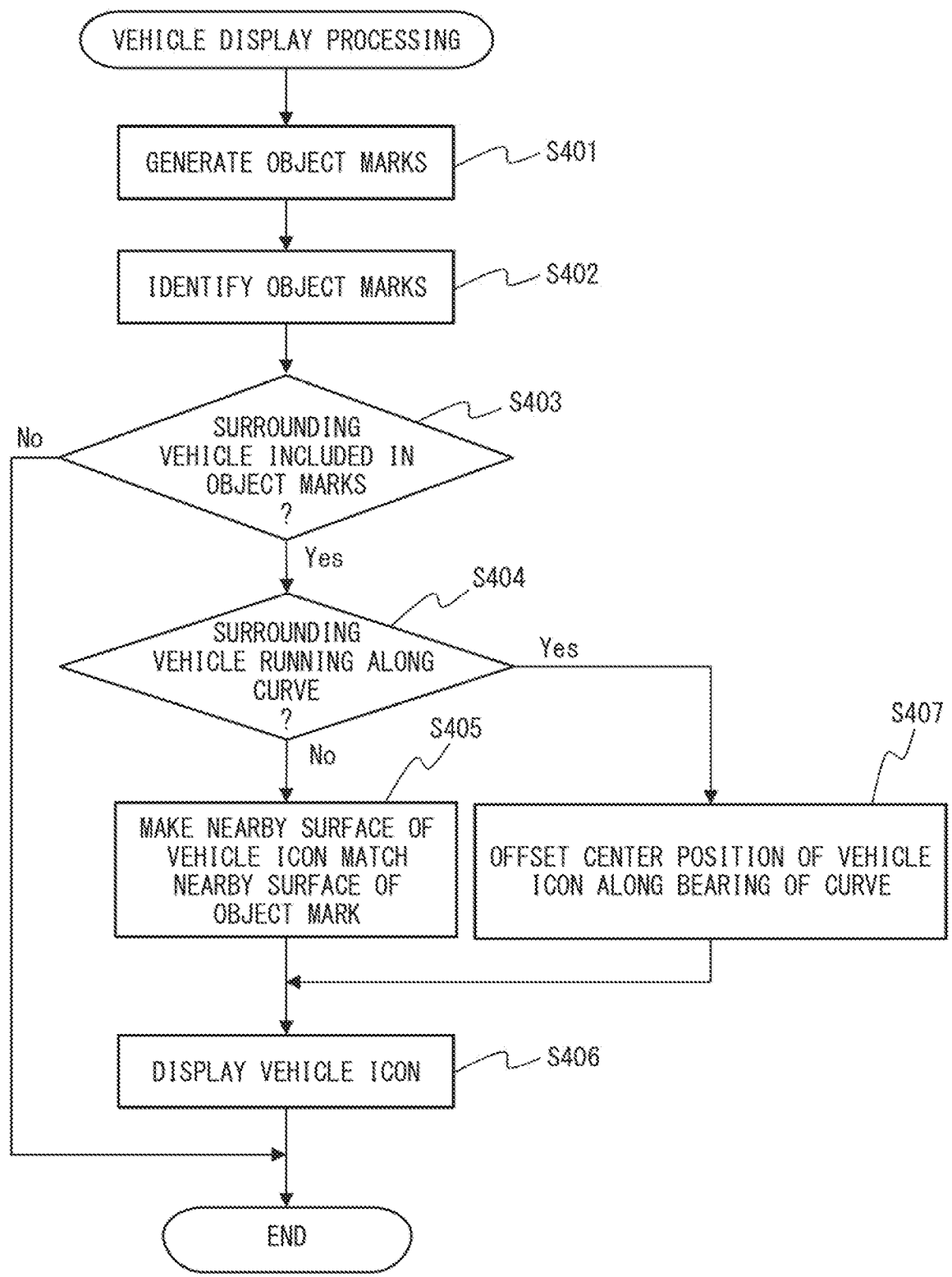
FIG. 14 is a flow chart showing a control routine of vehicle display processing in the fourth embodiment of the present invention.

FIG. 14 is a flow chart showing a control routine of vehicle display processing in the fourth embodiment of the present invention. The present control routine is repeatedly performed by the ECU 4 at predetermined performance intervals. The predetermined performance intervals are, for example, the intervals between which the output of the object detection device 2 is sent to the ECU 4.

Step S401 to step S403 are performed in the same way as step S101 to step S103 of FIG. 8. If at step S403 it is judged that no surrounding vehicle is included in the object marks, the present control routine ends. On the other hand, if at step S403 it is judged that a surrounding vehicle is included in the object marks, the present control routine proceeds to step S404.

At step S404, the position determining part 45 judges whether the surrounding vehicle is running along a curve. For example, the position determining part 45 judges whether the surrounding vehicle is running along a curve based on the shape, position, bearing, etc., of the object mark generated by the identifying part 44. Further, the position determining part 45 may judge whether the surrounding vehicle is running along a curve based on the bearing of a white line on the road detected by the camera 21 etc.

If at step S404 it is judged that the surrounding vehicle is not running along a curve, the present control routine proceeds to step S405. Step S405 and step S406 are performed in the same way as step S104 and step S105 of FIG. 8.

On the other hand, if at step S404 it is judged that the surrounding vehicle is running along a curve, the present control routine proceeds to step S407. At step S407, the position determining part 45 offsets the center position of the vehicle icon along the bearing of the curve from the center position of the object mark identified as the surrounding vehicle. For example, the position determining part 45 calculates the coordinates of the center position of the vehicle icon by the above-mentioned formulas (1) and (2) or the above-mentioned formulas (3) and (4).

After step S407, at step S406, the position determining part 45 displays the vehicle icon on the display device 3 in accordance with the position of the vehicle icon determined at step S407. After step S406, the present control routine ends.

Above, preferred embodiments according to the present invention were explained, but the present invention is not limited to these embodiments. They may be modified and changed in various ways within the language of the claims. For example, the positions and numbers of the camera 21, LIDAR 22, milliwave radar 23, and ultrasonic wave sensor 24 mounted at the vehicle may be different from those shown in FIG. 1. Further, a part of these (for example, the ultrasonic wave sensor 24) may be omitted.

Further, the ECU 4 may have a GPU (graphics processing unit). Further, there may be one type or three types or more of the vehicle icons displayed on the display device 3.

Furthermore, the above-mentioned embodiments can be worked combined in any way. For example, if the second embodiment and the third embodiment are combined, in the control routine of FIG. 11, step S404 of FIG. 14 is performed between step S203 and step S204, if the judgment at step S404 is affirmative, step S407 and step S406 of FIG. 14 are performed, and if the judgment at step S404 is negative, step S204 is performed.

Further, if the third embodiment and the fourth embodiment are combined, in the control routine of FIG. 12, step S404 of FIG. 14 is performed between step S303 and step S304, if the judgment at step S404 is affirmative, step S407 and step S406 of FIG. 14 are performed, and if the judgment at step S404 is negative, step S304 is performed.

REFERENCE SIGNS LIST 1. surrounding vehicle display system
2. object detection device
3. display device
4. electronic control unit (ECU)
10. vehicle
44. identifying part
45. position determining part

The invention claimed is:

1. A surrounding vehicle display system comprising:
   an object detection device detecting an object in surroundings of a host vehicle;
   an electronic control unit; and
   a display device, wherein
   the electronic control unit is configured to generate an object mark based on the object detected in the surroundings of the host vehicle, and identify the object mark,
   the display device displays the surrounding vehicle as a vehicle icon when the object mark is identified as a surrounding vehicle by the electronic control unit, and
   the electronic control unit is configured to determine a position of the vehicle icon with respect to the host vehicle on the display device and offset a center position of the vehicle icon from a center position of the object mark identified as the surrounding vehicle based on a predetermined size of the vehicle icon.

2. The surrounding vehicle display system according to claim 1, wherein the electronic control unit is configured to match a nearby surface of the vehicle icon and a nearby surface of the object mark identified as the surrounding vehicle by offsetting the center position of the vehicle icon, wherein the nearby surface of the vehicle icon and the nearby surface of the object mark are surfaces facing the host vehicle.

3. The surrounding vehicle display system according to claim 1, wherein the electronic control unit is configured to match a corner of the vehicle icon and a corner of the surrounding vehicle by offsetting the center position of the vehicle icon when the corner of the surrounding vehicle is identified.

4. The surrounding vehicle display system according to claim 1, wherein the electronic control unit is configured to match a nearby surface of the vehicle icon and a nearby surface of the object mark identified as the surrounding vehicle by offsetting the center position of the vehicle icon when the surrounding vehicle is running at a front, rear, or side of the vehicle, and calculate a weighted average offset amount in the vehicle icon width direction and a weighted average offset amount in the vehicle icon longitudinal direction by offsetting the center position of the vehicle icon when the surrounding vehicle is running diagonally forward or diagonally backward with respect to the host vehicle, wherein the nearby surface of the vehicle icon and the nearby surface of the object mark are surfaces facing the host vehicle.

5. The surrounding vehicle display system according to claim 1, wherein the electronic control unit is configured to offset the center position of the vehicle icon along a bearing of a curve when the surrounding vehicle is running along the curve.

\* \* \* \* \*